United States Patent
Zhang

(10) Patent No.: US 8,615,685 B2
(45) Date of Patent: Dec. 24, 2013

(54) SYSTEM AND METHOD FOR DETECTING ERRORS OCCURRING IN COMPUTING DEVICE

(75) Inventor: Yu-Gang Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 333 days.

(21) Appl. No.: 13/189,571

(22) Filed: Jul. 25, 2011

(65) Prior Publication Data

US 2012/0166864 A1   Jun. 28, 2012

(30) Foreign Application Priority Data

Dec. 25, 2010 (CN) .......................... 2010 1 0606848

(51) Int. Cl.
*G06F 11/00* (2006.01)

(52) U.S. Cl.
USPC .............................. 714/38.13; 714/34; 714/48

(58) Field of Classification Search
USPC ..................................... 714/34, 38.13, 39, 48
See application file for complete search history.

(56) References Cited

U.S. PATENT DOCUMENTS

| | | | |
|---|---|---|---|
| 6,948,094 B2 * | 9/2005 | Schultz et al. | 714/15 |
| 2002/0129186 A1 * | 9/2002 | Emerson et al. | 710/302 |
| 2003/0140285 A1 * | 7/2003 | Wilkie | 714/48 |
| 2005/0193259 A1 * | 9/2005 | Martinez et al. | 714/34 |
| 2006/0248411 A1 * | 11/2006 | Kirscht | 714/704 |
| 2007/0088988 A1 * | 4/2007 | Gupta et al. | 714/48 |
| 2008/0141077 A1 * | 6/2008 | Swanson et al. | 714/48 |
| 2008/0288764 A1 * | 11/2008 | Lu | 713/2 |
| 2009/0309866 A1 * | 12/2009 | Ziller | 345/214 |
| 2010/0218035 A1 * | 8/2010 | Avizienis | 714/4 |
| 2011/0231639 A1 * | 9/2011 | Chien | 713/2 |

* cited by examiner

*Primary Examiner* — Joshua Lohn
(74) *Attorney, Agent, or Firm* — Altis Law Group, Inc.

(57) ABSTRACT

A system and method detects errors occurring in a computing device. The computing device includes a central processing unit (CPU) and a memory. The method sets an interruption tag for the computing device and initializes the interruption tag as zero, and detects a general purpose input output (GPIO) signal output from the CPU through a GPIO interface. The method further determines whether the GPIO signal is in a first voltage level at every time interval, and adds one to the interruption tag when the GPIO signal is switched from the first voltage level to a second voltage level. In addition, the method determines that inter errors occur in the CPU if the interruption tag is equal to one, and determines that multi-bit errors occur in the memory if the interruption tag is greater than one.

18 Claims, 3 Drawing Sheets

SYSTEM AND METHOD FOR DETECTING ERRORS OCCURRING IN COMPUTING DEVICE

BACKGROUND

1. Technical Field

Embodiments of the present disclosure relate to computing device detection systems and methods, and particularly to a system and a method for detecting errors occurring in a computing device.

2. Description of Related Art

When a computing device (e.g., a computer, set-top box) is tested, it is required for an operator to rely on an error log generated by a base-board management controller (BMC) to find the reason why the computing device cannot operate normally. Multi-bit errors occurring in a memory of the computing device and internal errors occurring in a central processing unit (CPU) of the computing device may be among a plurality of issues causing the computing device to not operate normally. Accordingly, it is troublesome for the operator to determine which errors are occurring when the computing device is debugged.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
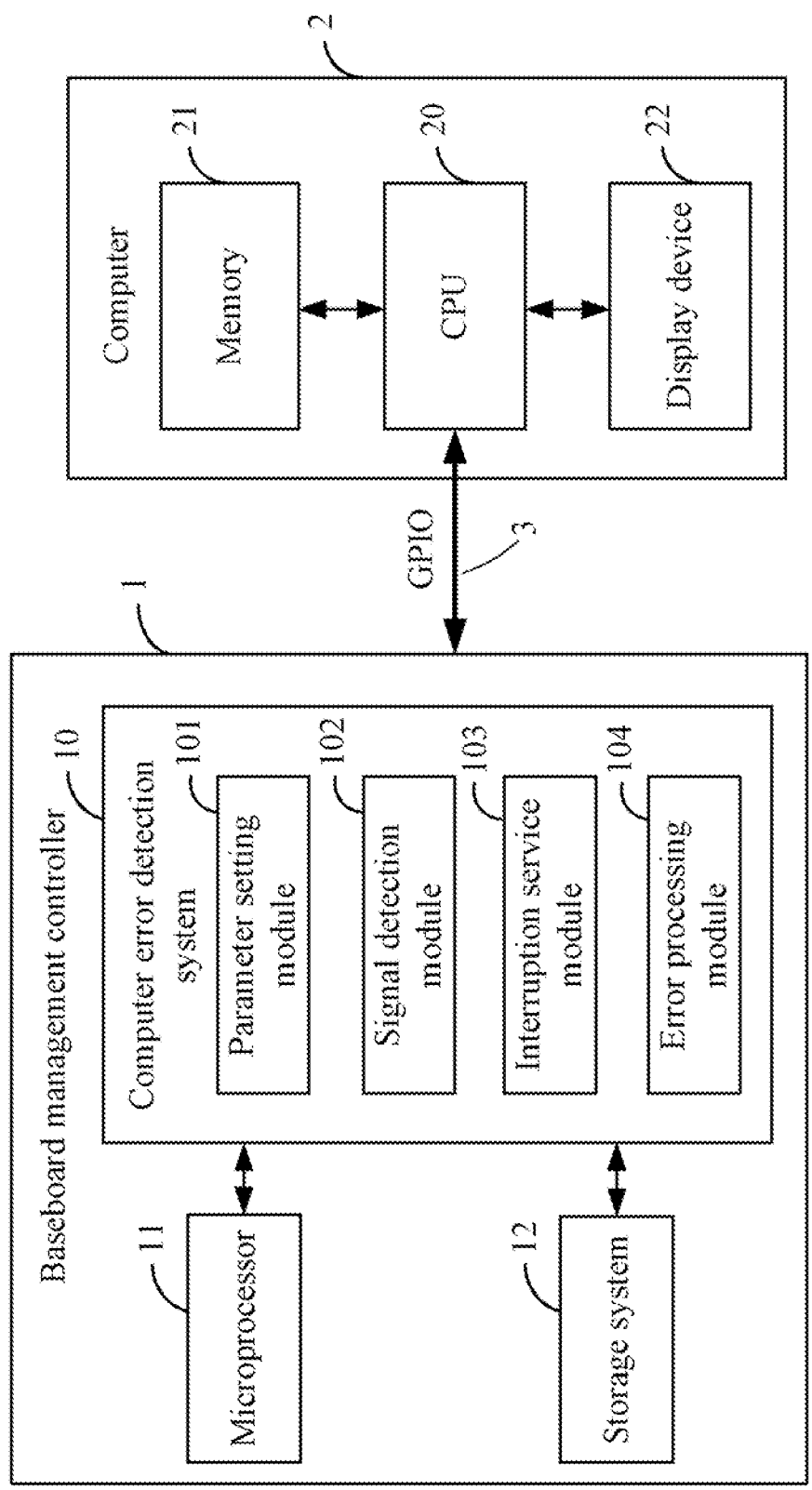
FIG. 1 is a block diagram of one embodiment of a base-board management controller (BMC) including an error detection system.

FIG. 1 is a block diagram of one embodiment of a base-board management controller (BMC) 1 including an error detection system 10. In the embodiment, the BMC 1 connects to a computing device 2 through a general purpose input output (GPIO) interface 3. The BMC 1 may further include at least one microprocessor 11 and a storage system 12. The computing device 2 may include a central processing unit (CPU) 20, a memory 21, and a display device 22. It should be understood that FIG. 1 illustrates only one example of the computing device 2 that may include more or fewer components than illustrated, or a different configuration of the various components in other embodiments.

The system 10 comprises computerized instructions in the form of one or more programs that are stored in the storage system 12, and executed by the at least one microprocessor 13 or other processors of the computing devices. In one embodiment, the storage system 12 may be an internal storage system, such as a random access memory (RAM) for temporary storage of information, and/or a read only memory (ROM) for permanent storage of information. In some embodiments, the storage system 12 may also be an external storage system, such as an external hard disk, a storage card, or a data storage medium.

In one embodiment, the system 10 includes a parameter setting module 101, a signal detection module 102, an interruption service module 103, and an error processing module 104. The modules 101-104 may comprise computerized code in the form of one or more programs that are stored in the storage unit 12 and executed by the microprocessor 11 to provide functions for implementing the modules. In general, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives.

The parameter setting module 101 is operable to set an interruption tag for the computing device 2, and initialize the interruption tag as zero. In the embodiment, the interruption tag is defined as how many times has an interruption program been executed to execute an interruption service by the CPU 20. When one interruption service is executed by the interruption program, the interruption tag is increased by one, i.e., tag=tag+1.

The signal detection module 102 is operable to detect a GPIO signal output from the CPU 20 through the GPIO interface 3 during operation of the computing device 2, and determine whether the GPIO signal is a first voltage level or a second voltage level at a time interval at every time interval. In one embodiment, the first voltage level is defined as a high voltage level that is represented by a digital number "1", and the second voltage level is defined as a low voltage level that is represented by a digital number "0". In the embodiment, the time interval is determined according to the frequency of the CPU 20, for example, assuming that the frequency of the CPU 20 is 1000 Hz, the time interval may be determined as 1 second.

Figure 3A:
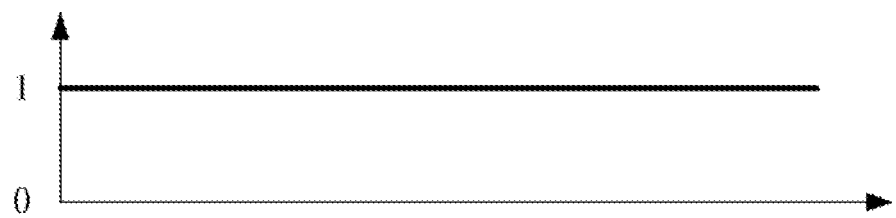
FIG. 3A, FIG. 3B, and FIG. 3C are schematic diagrams illustrating examples of GPIO signals output from a CPU included in a computing device of FIG. 1.
Figure 3B:
Figure 3C:
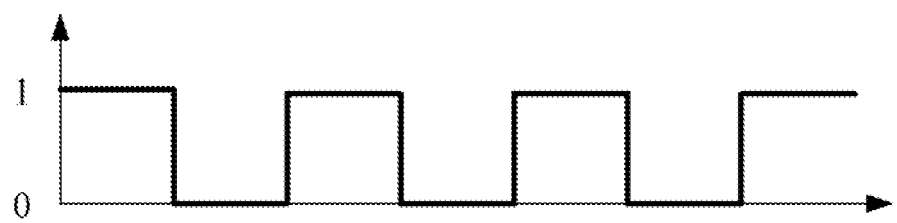

The CPU 20 always outputs the GPIO signal in a high voltage level when the computing device 2 operates normally. As shown in FIG. 3A, the GPIO signal may be represented by the digital number "1" during the normal operation of the computing device 2. When inter errors (IERR) occur in the CPU 20, the CPU 20 pulls the GPIO signal down to a low voltage level from the high voltage level, and then always outputs the GPIO signal in the low voltage level. As shown in FIG. 3B, the GPIO signal may be represented by the digital number "0" when inter error (IERR) occur in the CPU 20. When the CPU 20 reads data stored in the memory 21, memory errors are found if uncorrected, the CPU 20 switches the GPIO signal from the high voltage level to the low voltage level alternately, as shown in FIG. 3C.

The interruption service module 103 is operable to run an interruption program to execute an interruption service when the GPIO signal is switched from the high voltage level to the low voltage level, and adds one to the interruption tag, i.e., tag=tag+1. The interruption service module 103 is further operable to check the interruption tag to determine whether the interruption tag is equal to one.

If the interruption tag is equal to one, the error processing module 104 determines that inter errors occur in the CPU 20, and determines that multi-bit errors occur in the memory 21 if the interruption tag is greater than one. The processing module 104 further determines whether the computing device 2 is inoperable when the errors occur in the CPU 20 or the memory 21. In the embodiment, when the GPIO signal is not received from the GPIO interface 3, the processing module 104 determines that the computing device 2 is inoperable. The processing module 104 generates a reset signal to restart the computing device 2 to debug the multi-bit errors occurring in the memory 21, and generates a terminate signal to shut off the computing device 2 to debug the errors occurring in the CPU 20.

Figure 2:
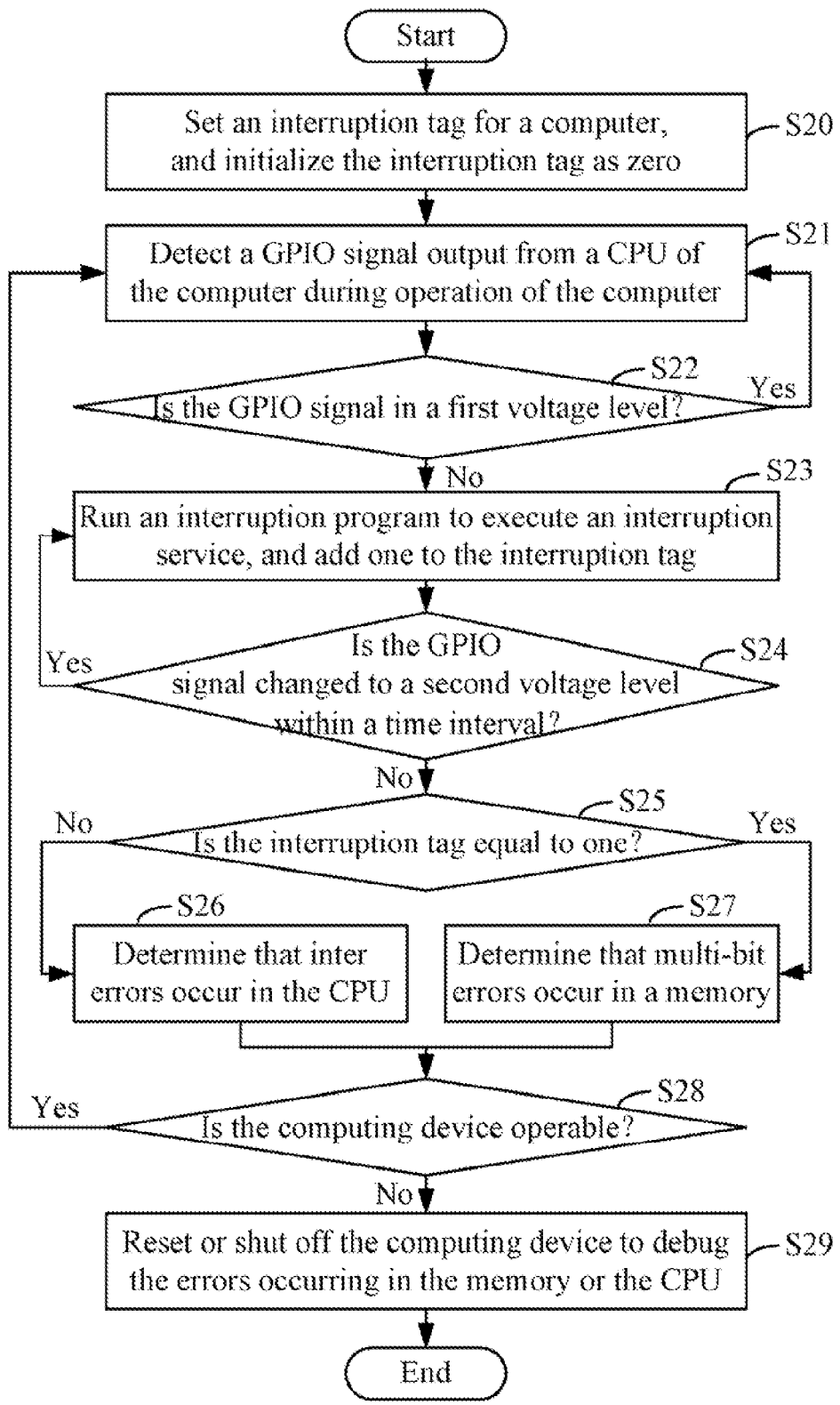
FIG. 2 is a flowchart of one embodiment of a method for detecting errors occurring in a computing device using the BMC of FIG. 1.

FIG. 2 is a flowchart of one embodiment of a method for detecting errors occurring in a computing device using the BMC 1 of FIG. 1. In the embodiment, the method can determine whether the errors are occurring inter errors in the CPU 20 or occurring multi-bit errors in the memory 21, and generate a reset signal to restart the computing device 2 to debug the multi-bit errors of the memory 21, or a terminate signal to shut off the computing device 2 to debug the errors of the CPU 20. Depending on the embodiment, additional blocks may be added, others removed, and the ordering of the blocks may be changed.

In block S20, the parameter setting module 101 sets an interruption tag for the computing device 2, and initializes the interruption tag as zero. In the embodiment, the interruption tag is defined as a times for running an interruption program to execute an interruption service by the CPU 20. When one interruption service is executed by the interruption program, the interruption tag is increased by one, i.e., tag=tag+1.

In block S21, the signal detection module 102 detects a GPIO signal output from the CPU 20 through the GPIO interface 3 during operation of the computing device 2. The GPIO signal may be in a first voltage level that is defined as a high voltage level represented by a digital number "1", and a second voltage level that is defined as a low voltage level represented by a digital number "0".

In block S22, the signal detection module 102 determines whether the GPIO signal is in the first voltage level or the second voltage level. If the GPIO signal is the first voltage level, block S21 is repeated. Otherwise, if the GPIO signal is the second voltage level, block S23 is implemented.

In block S23, the interruption service module 103 runs an interruption program to perform an interruption service when the GPIO signal is switched from the first voltage level to the second voltage level, and adds one to the interruption tag, i.e., tag=tag+1.

In block S24, the signal detection module 102 determines whether the GPIO signal is switched from the first voltage level to the second voltage level at every time interval. In the embodiment, the time interval is determined according to the frequency of the CPU 20, for example, assuming that the frequency of the CPU 20 is 1000 Hz, the time interval may be determined as 1 seconds. If the GPIO signal is the second voltage level, block S23 is repeated. Otherwise, if the GPIO signal is the second voltage level, block S25 is implemented.

In block S25, the interruption service module 103 checks the interruption tag to determine whether the interruption tag is equal to one. If the interruption tag is greater than one, in block S26, the interruption service module 103 determines that inter errors occur in the CPU 20. Otherwise, if the interruption tag is equal to one, in block S27, the interruption service module 103 determines that multi-bit errors occur in the memory 21.

In block S28, the processing module 104 determines whether the computing device 2 is operable when the errors occur in the CPU 20 or the memory 21. In the embodiment, the processing module 104 determines that the computing device 2 is inoperable when the GPIO signal is not received from the GPIO interface 3. If the computing device 2 is operable, block S21 is repeated. Otherwise, if the computing device 2 is inoperable, block S29 is implemented.

In block S29, the processing module 104 generates a reset signal to restart the computing device 2 to debug the multi-bit errors occurring in the memory 21, or generates a terminate signal to shut off the computing device 2 to debug the errors occurring in the CPU 20.

All of the processes described above may be embodied in, and fully automated via, functional code modules executed by one or more general purpose processors of the computing devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A base-board management controller (BMC), the BMC being connected to a computing device through a general purpose input output (GPIO) interface, the BMC comprising:
   a storage system;
   at least one microprocessor; and
   one or more programs stored in the storage system and executable by the at least one microprocessor, the one or more programs comprising:
   a parameter setting module operable to set an interruption tag for the computing device, and initialize the interruption tag as zero;
   a signal detection module operable to detect a GPIO signal output from a central processing unit (CPU) of the computing device through the GPIO interface during operation of the computing device, and determine whether the GPIO signal is in a first voltage level at every time interval;
   an interruption service module operable to run an interruption program to execute an interruption service when the GPIO signal is switched from the first voltage level to a second voltage level, add one to the interruption tag, and check the interruption tag to determine whether the interruption tag is equal to one; and
   an error processing module operable to determine that inter errors occur in the CPU if the interruption tag is equal to one, or determine that multi-bit errors occur in the memory if the interruption tag is greater than one.

2. The BMC according to claim 1, wherein the processing module is further operable to determine whether the computing device is operable when the errors occur in the CPU or the memory, and generate a reset signal to restart the computing device to debug the multi-bit errors occurring in the memory, or a terminate signal to shut off the computing device to debug the errors occurring in the CPU.

3. The BMC according to claim 1, wherein the first voltage level is defined as a high voltage level that is represented by a digital number "1", and the second voltage level is defined as a low voltage level that is represented by a digital number "0".

4. The BMC according to claim 1, wherein the CPU pulls the GPIO signal down to the second voltage level from the first voltage level and outputs the GPIO signal in the second voltage level when the inter errors occur in the CPU.

5. The BMC according to claim 1, wherein the CPU alternately switches the GPIO signal from the first voltage level to the second voltage level when the multi-bit errors occur in the memory.

6. The BMC according to claim 1, wherein the time interval is determined according to a frequency of the CPU.

7. A method for detecting errors occurring in a computing device, the computing device comprising a central processing unit (CPU) and a memory, the method comprising:
 setting an interruption tag for the computing device, and initializing the interruption tag as zero;
 detecting a general purpose input output (GPIO) signal output from the CPU through a GPIO interface during operation of the computing device;
 determining whether the GPIO signal is in a first voltage level at every time interval;
 executing an interruption program to perform an interruption service when the GPIO signal is switched from the first voltage level to a second voltage level;
 adding one to the interruption tag;
 checking the interruption tag to determine whether the interruption tag is equal to one;
 determining that inter errors occur in the CPU if the interruption tag is equal to one; or
 determining that multi-bit errors occur in the memory if the interruption tag is greater than one.

8. The method according to claim 7, further comprising:
 determining whether the computing device is operable when the errors occur in the CPU or the memory; and
 generating a reset signal to restart the computing device to debug the multi-bit errors occurring in the memory; or
 generating a terminate signal to shut off the computing device to debug the errors occurring in the CPU.

9. The method according to claim 7, wherein the first voltage level is defined as a high voltage level that is represented by a digital number "1", and the second voltage level is defined as a low voltage level that is represented by a digital number "0".

10. The method according to claim 7, wherein the CPU pulls the GPIO signal down to the second voltage level from the first voltage level and outputs the GPIO signal in the second voltage level when the inter errors occur in the CPU.

11. The method according to claim 7, wherein the CPU alternately switches the GPIO signal from the first voltage level to the second voltage level when the multi-bit errors occur in the memory.

12. The method according to claim 7, wherein the time interval is determined according to a frequency of the CPU.

13. A non-transitory computer-readable medium having stored thereon instructions that, when executed by at least one microprocessor of a base-board management controller (BMC), cause the microprocessor to perform a method for detecting errors occurring in a computing device, the method comprising:
 setting an interruption tag for the computing device, and initializing the interruption tag as zero;
 detecting a general purpose input output (GPIO) signal output from a central processing unit (CPU) of the computing device through a GPIO interface during operation of the computing device;
 determining whether the GPIO signal is in a first voltage level at every time interval;
 executing an interruption program to perform an interruption service when the GPIO signal is switched from the first voltage level to a second voltage level;
 adding one to the interruption tag;
 checking the interruption tag to determine whether the interruption tag is equal to one;
 determining that inter errors occur in the CPU if the interruption tag is equal to one; or
 determining that multi-bit errors occur in a memory of the computing device if the interruption tag is greater than one.

14. The medium according to claim 13, wherein the method further comprises:
 determining whether the computing device is operable when the errors occur in the CPU or the memory; and
 generating a reset signal to restart the computing device to debug the multi-bit errors occurring in the memory; or
 generating a terminate signal to shut off the computing device to debug the errors occurring in the CPU.

15. The medium according to claim 13, wherein the first voltage level is defined as a high voltage level signal that is represented by a digital number "1", and the second voltage level is defined as a low voltage level signal that is represented by a digital number "0".

16. The medium according to claim 13, wherein the CPU pulls the GPIO signal down to the second voltage level from the first voltage level and outputs the GPIO signal in the second voltage level when the inter errors occur in the CPU.

17. The medium according to claim 13, wherein the CPU alternately switches the GPIO signal from the first voltage level to the second voltage level when the multi-bit errors occur in the memory.

18. The medium according to claim 13, wherein the time interval is determined according to a frequency of the CPU.

\* \* \* \* \*